(12) United States Patent
Hue et al.

(10) Patent No.: US 8,520,952 B2
(45) Date of Patent: Aug. 27, 2013

(54) SYSTEM AND METHOD FOR DEFINING A SEARCH WINDOW

(75) Inventors: David Hue, Chatou (FR); Samia Ahiad, Villemomble (FR); Abdelaziz Bensrhair, Mont Saint Aignan (FR)

(73) Assignee: Valeo Vision, Bobigny (FR)

( * ) Notice: Subject to any disclaimer, the term of this patent is extended or adjusted under 35 U.S.C. 154(b) by 368 days.

(21) Appl. No.: 12/831,532

(22) Filed: Jul. 7, 2010

(65) Prior Publication Data

US 2011/0019922 A1 Jan. 27, 2011

(30) Foreign Application Priority Data

Jul. 8, 2009 (FR) ...................................... 09 03383

(51) Int. Cl.
*G06K 9/48* (2006.01)
(52) U.S. Cl.
USPC ............................................ 382/199; 382/104
(58) Field of Classification Search
None
See application file for complete search history.

(56) References Cited

U.S. PATENT DOCUMENTS

| 2003/0083790 | A1  | 5/2003 | Hattori et al. |         |
|--------------|-----|--------|----------------|---------|
| 2004/0057599 | A1* | 3/2004 | Okada et al.   | 382/103 |
| 2009/0128309 | A1* | 5/2009 | Hue et al.     | 340/425.5 |

OTHER PUBLICATIONS

Shu-Yen Wan and William E. Higgins, "Symmetric Region Growing", Sep. 2003, IEEE Transactions on Image Processing, vol. 12., No. 9, pp. 1007-1015.*
Kaohler; "A Segmentation System Based on Thresholding. Graphical Models and Image Processing". 1981.
Hautiére et al.; "Automatic Fog Detection and Estimation of Visibility Distance Through Use of an Onboard Camera", Machine Vision and Applications, Springer Berlin, vol. 17, No. 1, pp. 8-20. Apr. 1, 2006.
Pomerleau, D.; "Visibility Estimation from a Moving Vehicle using the RALPH Vision System", Intelligent Transportation System, 1997. ITSC '97. IEEE Conference on Boston, MA, USA, Nov. 1997, New York, NY, USA, IEEE, US, pp. 906-911. Nov. 9, 1997.

* cited by examiner

*Primary Examiner* — Samir Ahmed
*Assistant Examiner* — Siamak Harandi
(74) *Attorney, Agent, or Firm* — Jacox, Meckstroth & Jenkins

(57) ABSTRACT

A system and method for defining a window to search a region of interest for processing a road image, the search window having a longitudinal orientation directed according to the height of the image and being laterally delimited by two edges. The shape of the search window is adapted to the road configuration by defining at least one non-vertical portion on one of the edges. A preferred application is the processing of road images for determining visibility distances in foggy weather.

37 Claims, 5 Drawing Sheets

SYSTEM AND METHOD FOR DEFINING A SEARCH WINDOW

CROSS-REFERENCE TO RELATED APPLICATIONS

This application claims priority to French Application No. 0903383 filed Jul. 8, 2009, which application is incorporated herein by reference and made a part hereof.

BACKGROUND OF THE INVENTION

1. Field of the Invention

The present invention relates to a system and method for defining a window to search a region of interest in an image. It also relates to a system disposing of means capable of implementing this method as well as a method for determining a visibility distance in foggy weather.

A preferred application of the invention is the field of automotive equipment, in particular for detecting visibility distance in foggy weather.

2. Description of the Related Art

With the development of electronic technologies, sensors and means of processing, numerous improvements have been proposed to make driving vehicles more safe or comfortable. Some of these improvements rely on analyzing an image of the environment around the vehicle in order to adapt handling of the vehicle or to inform the driver. Such is the case with systems for determining a visibility distance. These systems in particular are directed to adjusting the lighting of the vehicle according to the visibility distance.

In the known way, these systems include acquisition of an image and determination of a region of interest in this image, intended to be processed in real time. Determination of a region of interest aims to limit the area of the image which is the object of the processing and consequently to reduce the quantity of data to be processed. This enables the time and resources required for processing to be reduced. It also allows elements of the image which would disturb its processing to be excluded.

Determining a region of interest traditionally implies the definition of a search window inside which the region of interest is then determined. In existing technologies, the search window is a simple vertical band crossing the image according to its height and laterally delimited by two vertical rectilinear edges.

It is easy to understand that the definition of the search window directly impacts the field forming the region of interest and thus the extent and quality of the digital processing, such that optimization of the definition of the search window is an important part of the overall processing.

What is needed, therefore, is an improved system and method for improving optimizing the definition of the search window.

SUMMARY OF THE INVENTION

One object of the present invention is to optimize the definition of a search window in an image and particularly a road image.

For this purpose, one embodiment of the invention proposes a method for defining a window to search a region of interest for processing a road image, the search window having a longitudinal orientation directed according to the height of the image and being laterally delimited by two edges. According to a first aspect of the invention, this method is such that the shape of the search window is adapted to the road configuration by defining at least one non vertical portion on at least one of the.

By virtue of this measure, the shape of the window can be adapted, that is to say deformed, relatively to the shape of a simple band so as to adjust the morphology of the window to the road configuration. Details further down in the description will demonstrate that this in particular allows the window to be given a shape which varies according to the presence (and extent) or absence of a bend.

The method according to one embodiment of the invention will also be able to offer, in an optional way, at least one of the following features:

the non-vertical portion is positioned such that it is situated at least partially in a transitional area of the image between a road carriageway and the sky. Thus, the shape of the window is modified at an important place of the image, particularly in the context of calculating visibility distance, since it is an area of discontinuity of environments in the image;

the edge comprises a low vertical portion below the non-vertical portion. It is a question of being selective as regards the shape of the window especially around the area situated above the low vertical portion. According to an alternative embodiment, the edge also includes a high vertical portion above the non-vertical portion. This makes it possible to be even more selective with respect to an intermediate area between two areas where the edge is vertical;

the non-vertical portion can be a horizontal right segment; it is particularly advantageous if this area of the window is split between a lower area and a higher area. It can also be a right-sloping segment; in this case an advantageous embodiment is that this sloping portion gradually joins two upper and lower areas. Another possibility is a curvilinear line portion;

at least one non-vertical portion is defined on the other of the edges. This option increases the possibilities for selecting the shape of the window. In a preferred case, the vertical portion on the other edge is situated roughly opposite the non-vertical portion of the first edge according to the height of the image, such that these portions form a specific area of the window laterally delimited by two non vertical portions;

the non-vertical portions of the two edges are parallel; also, the whole of the two edges can be parallel;

a plurality of areas is defined in the search window with:

a bottom area laterally delimited by a low vertical portion of each of the edges;

a second area situated at the top of said bottom area and laterally delimited by the non-vertical portion of each of the edges. This configuration is particularly well adapted to the road environment since the substantially rectangular bottom area can be positioned on a level with the carriageway and therefore can be allocated to a specific portion of the image. Modulation of the search window can thus relate only to the second area of this window, the method therefore requiring fewer calculations. This modulation may depend on the bends, for example a modulation according to the curvature of the road;

a third area laterally delimited by a high vertical portion of each one of the edges is defined, the second area connecting the bottom area and the second area. The second area thus corresponds to an intermediate area which itself also ensures a transition between the bottom area and the third area. In addition, the high part can be laterally offset relative to the bottom area, the intermediate area deforming to ensure continuity between the bottom area and the third area. Also, depending on the shape of the intermediate area, the transition can be abrupt to a greater or lesser degree;

the position of a vanishing point of a road carriageway is defined and the bottom area is laterally positioned according to the position of the vanishing point. This results in an advantageous refinement in calibrating the bottom area in relation to the carriageway. One possibility is to laterally center the bottom area on the vanishing point;

the position of the vanishing point is obtained by a device for detecting the crossing of a white line. Such a device, to which systems known under the acronym LDWS (lane departure warning system) belong, is being increasingly fitted to vehicles and comprises both video as well as processing means to determine the vanishing point. Thus, two technologies which could have been thought as being completely different are advantageously combined;

the non-vertical edges of the second area are moved and/or deformed according to the direction of the bend, the vanishing point PF being inside the second area; this enables the search window to be adapted to the curvature of the road for example;

the third area with a lateral offset is positioned relatively to the bottom area, the offset depending on the curvature data of a bend of the road carriageway. Combined with calibrating the bottom area on the vanishing point, this solution is particularly suitable for processing bends. The second area then deforming to continue to ensure the transition between the bottom area and the third area, the second area will be formed overall according to the curvature of the bend, when the lateral offset is made towards the interior of the bend;

the bend curvature data are obtained from a cartography of a navigation system or correspond to a value computed by image analysis or again result from measuring the rotation angle of the steering wheel. According to one alternative, the angle corresponds to the rotation angle of a headlamp transmitted from a directional lighting device or "bending light system" which adapts the light beam angle to the angle of the bends; and the position of at least one point of a horizon line of the image is defined and the second area is vertically centered on the point of the horizon line. This point can be the vanishing point indicated above. The line of horizon can also be defined particularly by vehicle attitude sensors.

In an exemplary embodiment of the invention, at least two areas are defined in the search window with:

a bottom area laterally delimited by a low vertical portion of each of the edges; and a second area situated at the top of the bottom area and laterally delimited by the non-vertical portion of each of the edges.

The invention also relates to a method for determining a visibility distance in foggy weather, wherein a region of interest is determined within a search window defined by implementing the preceding method, and wherein an average luminance level is determined for a plurality of lines in this region of interest, a luminance profile is deduced therefrom, an inflection point is identified on this luminance profile and a visibility distance is deduced from this inflection point.

The invention also relates to a system for determining a window to search a region of interest in an image, wherein it comprises a device for acquiring an image and means of processing arranged to implement the method for determining a visibility distance in foggy weather according to the present invention or the method for determining a visibility distance in foggy weather stated in the preceding paragraph.

According to one aspect of the invention which can be employed separately from the above method, the system for determining a window to search a region of interest in an image has a device for detecting the crossing of white lines, configured in order to produce data for defining a position of a vanishing point and means for transmitting the data to the means of processing. At least one area of the window (such as a bottom area) or all the window in the shape of a band or otherwise can then be positioned laterally according to the vanishing point (which does not exclude other positioning parameters including a bend angle or steering wheel angle and without resorting to additional means for determining the vanishing point.

The invention also relates to a vehicle comprising a system according to the two preceding paragraphs.

According to another aim of the invention, a computer software package is provided comprising one or more sequences of instructions executable by a data processor, the execution of the sequences of instructions allowing the method to be implemented according to any one of the features of the preceding method.

Other features, objectives and advantages of this invention will appear upon reading the detailed description below and with reference to the appended drawings given as non-restrictive examples.

These and other objects and advantages of the invention will be apparent from the following description, the accompanying drawings and the appended claims.

BRIEF DESCRIPTION OF THE ACCOMPANYING DRAWINGS

DETAILED DESCRIPTION OF THE PREFERRED EMBODIMENTS

With reference to FIGS. 1 to 5, examples of implementing the invention for determining a region of interest in an optimized search window are illustrated. In these examples, determination of a region of interest has as an application the definition of a visibility distance particularly in foggy weather. Calculation of the visibility distance enables, for example, a motorist to be provided with a maximum driving distance and a minimum safety distance to be respected. This application of detecting a visibility distance constitutes an example which allows the invention to be clearly understood but does not limit it in any way. The method for defining a search window according to the invention can in fact be applied to an algorithm for detecting obstacles on the road. Evaluation of the visibility distance for example employs the steps illustrated in FIG. 1:

an image of the environment situated in front of a vehicle (step 101) is acquired; and a region of interest is determined in the image. Prior to this, a search window, inside which the processing necessary for determining the region of interest is carried out (step 102), is advantageously positioned in the image.

The region of interest (step 103) can be determined by a method known as "region growing". According to this method, the luminance of each pixel is analyzed and compared with the luminance of the pixels which are adjacent thereto. If the variation in luminance is less than a preset threshold, the region of interest is extended to these adjacent pixels so as to define a homogeneous area, if not these pixels are excluded from the region of interest. This is fully described in the document: "A segmentation system based on thresholding. Graphical Models and Image Processing" [Käohler, 1981], which is incorporated herein by reference and made a part hereof.

A grey scale or luminance profile curve is determined by taking account of the grey level of the lines in the region of interest (step 104).

The relevant inflection point is determined by identifying this curve.

From the position of the inflection point in the image and the position of the attitude sensors, the visibility distance is deduced therefrom using Koschmieder's law (step 106). For this purpose, reference can be made to Nicolas Hautière's theory and the article: "Automatic fog detection and estimate of visibility through the use of an onboard camera" published in the review "Machine vision and application" Springer-Verlag, BE, vol. 17 No. dated Apr. 1, 2006, which is incorporated herein by reference and made a part hereof.

Evaluation of the visibility distance is directly determined by the relevance of the luminance profile. The latter itself closely depends on the homogeneity of the region of interest and thus on the prior placement of the search window.

Figure 1:
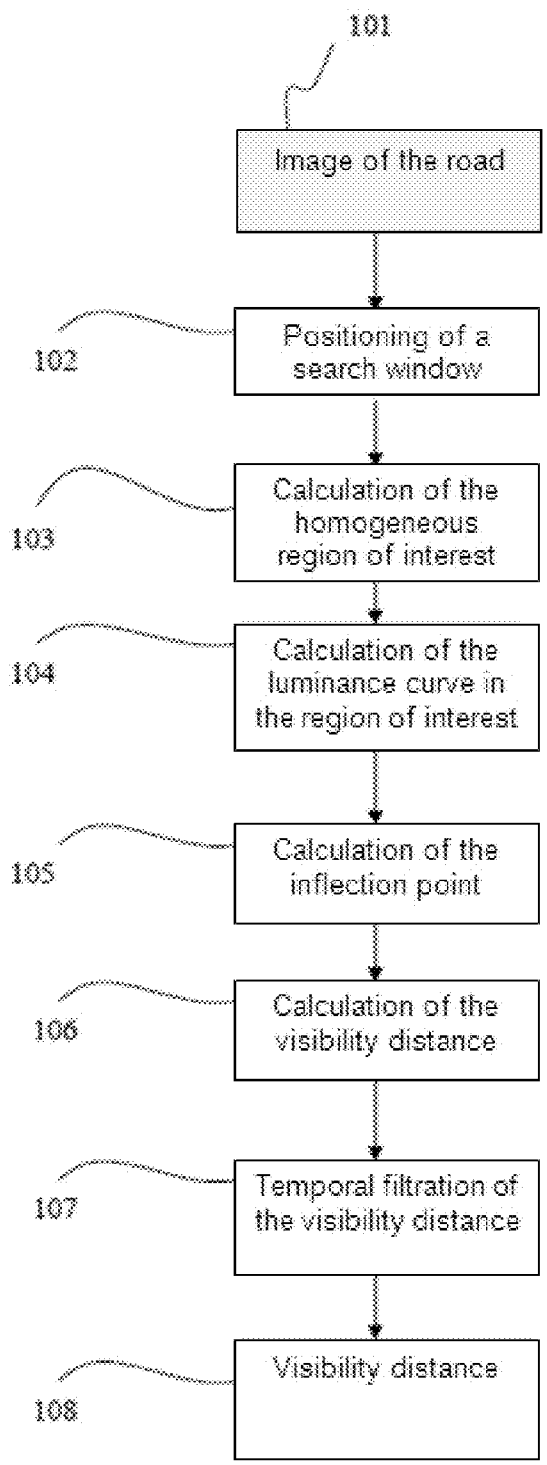
FIG. 1 illustrates the principal phases of a method for determining visibility distances.
Figure 2A:
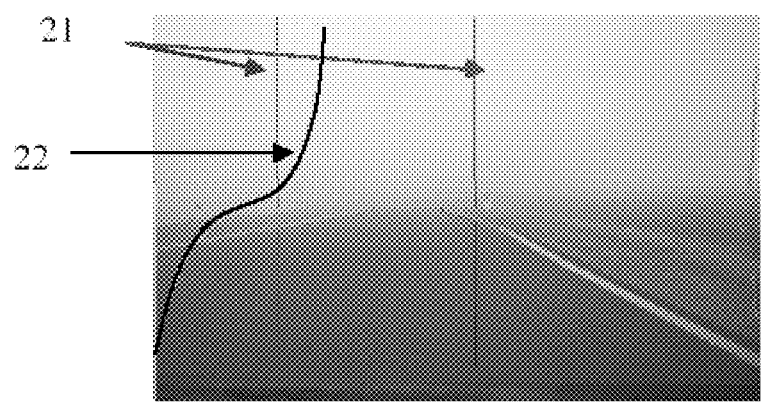
FIG. 2a shows a case of determining a relevant region of interest and FIG. 2b exhibits a case of non-relevance as may arise according to current techniques.

FIG. 2a is a photograph of an environment situated in front of the vehicle and includes few details. The search window is a vertical band delimited by vertical and rectilinear edges 21 crossing the image from bottom to top without encountering any particular points because no obstacle or surrounding object (such as a road sign, tree, etc.) is present. This figure includes a luminance profile 22 having a substantially "S" shape with only one inflection point. Determination of the visibility distance is then possible and precise even based on a conventional search window.

Figure 2B:
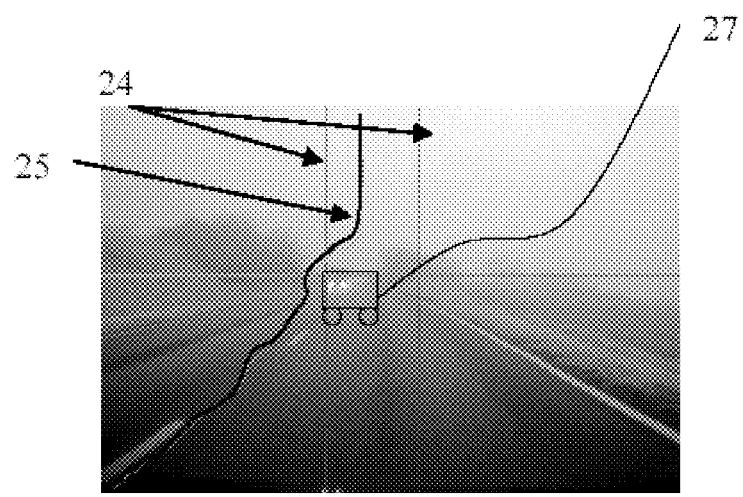

However, this is not always the case. On this subject, FIG. 2b illustrates an evaluation of the visibility distance in a more complex road context. The environment situated in front of the vehicle includes objects such as a vehicle 27 approaching in the opposite direction, trees etc. The region of interest retained on the basis of a conventional search window, delimited by vertical edges 24, includes these objects. This region of interest retained is thus not homogeneous. The luminance profile 25 is disturbed by these objects being taken into account. The visibility distance is then incorrect. It is easy to understand that the imprecise positioning of the search window is at least partly responsible for this result.

As indicated above, the invention proposes a method for defining a search window in order to determine a region of interest. This search window is optimized in relation to the known techniques.

A preferred mode of embodiment of the invention will now be detailed with reference to FIGS. 3 to 9.

Figure 3:
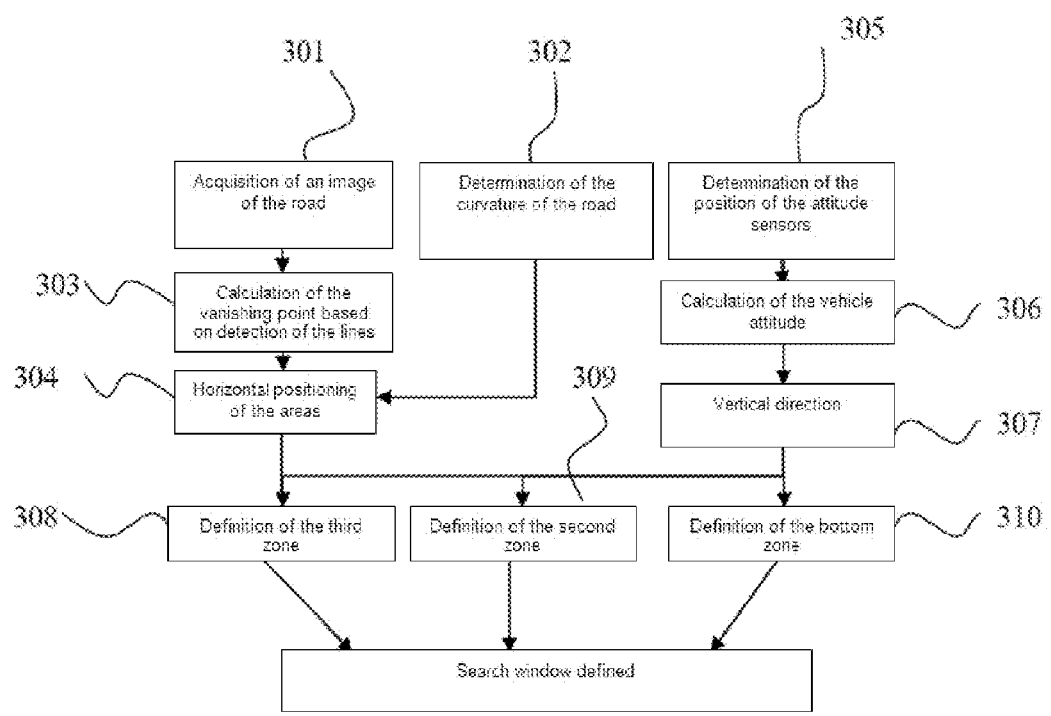
FIG. 3 is a diagram of steps for implementing the method of the invention.
Figure 4:
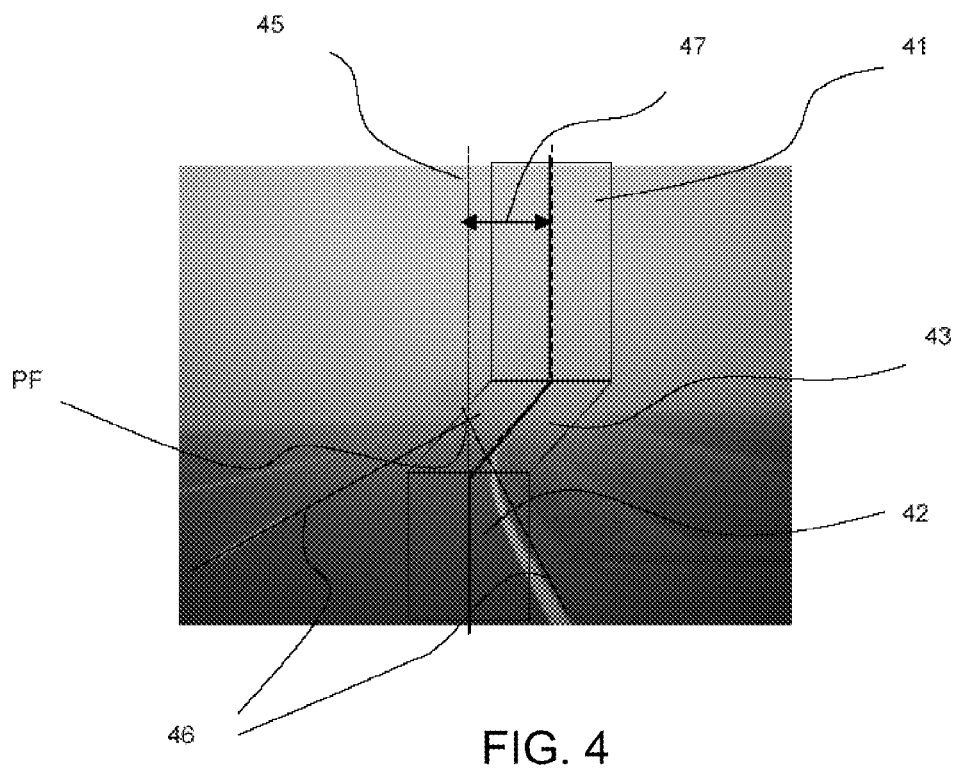
FIGS. 4 and 5 illustrate two cases of a search window being formed according to the invention in a road environment with bend.
Figure 5:
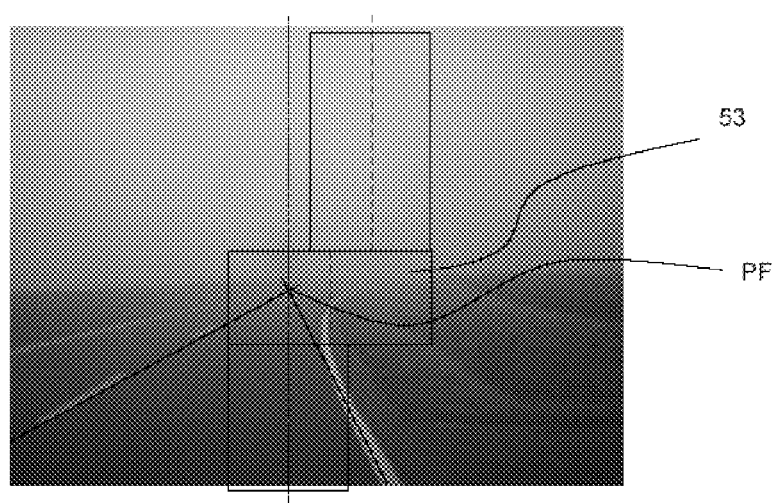

FIG. 3 gives an example of a sequence of phases for defining a window. At reference 301, an image of the road is acquired, in particular by all current acquisition means of the digital camera type, fitted so as to point in front of the vehicle equipped with the system of the invention. FIGS. 4 and 5 give two illustrations of images obtained. Possibly, one or more attitude sensors are used at step 305 and acquire data 306 concerning the attitude of the vehicle, data used by the method to correct, if necessary, the vertical direction 307 of the image acquired. Vertical direction is understood to mean the direction crossing the image from the bottom to the top, between the part comprising the road carriageway and the part comprising the sky.

Preferably, the search window extends from the top to the bottom of the image over its whole height. This case, however, is not restrictive and the height of the search window can be limited in one portion of the image. The window is laterally delimited by two edges, the definition of which is an important element of the method demonstrated here. The invention benefits from the fact that the image comprises different areas according to its vertical direction, such that the window covers heterogeneous areas with respect to the grey scale average and with respect to the objects which are present.

A typical configuration of the image is detailed below. Thus, the top of the image corresponds to the sky. The top of the image therefore has a higher grey scale average compared to the remainder of the image. Objects which can usually be found in the top of the image are trees, lamp posts, bridges etc.

The bottom of the image corresponds to the road and the immediate surroundings of the vehicle. The bottom of the image therefore has a higher grey scale average, which is low compared to the remainder of the image. The objects which can usually be found at the bottom of the image are road markings, vehicles being followed or approaching in the opposite direction, pedestrians or any object lying on the ground.

The middle of the image corresponds to an intermediate area ensuring the transition between the areas mentioned above and forming the top and bottom of the image. It is in this intermediate area that the inflection point sought will be found in order to evaluate the visibility distance.

To adapt to these variations, the search window is defined according to the invention so that it is not completely vertical. This is understood to mean that at least one of its side edges is not integrally directed in accordance with the vertical direction of the image. Whereas the prior art uses a fixed window shape with a vertical band, the invention produces a window that can be adapted to the context of the image.

Many variations of the window shape enter into the framework of the invention. In particular, the two edges can have non-vertical portions or only one of them. A plurality of non-vertical portions can be defined along one or more of the edges.

FIGS. 6 to 9 show some exemplary embodiments.

Figure 6:
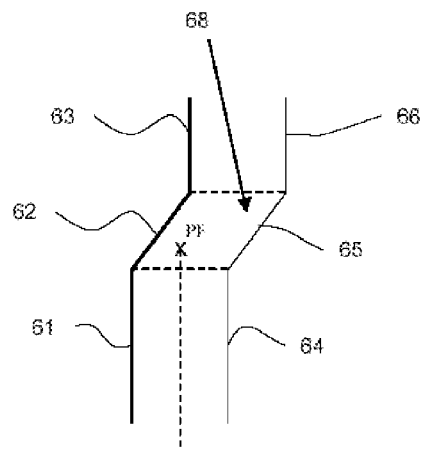
FIGS. 6 to 9 schematize four examples of search windows obtained by the invention.

In FIG. 6 two parallel and continuous edges each comprise a low vertical portion 61, 64 then a non-vertical portion 62, 65 in the shape of a right-sloping segment. At the top of the non-vertical portions 62, 65, the edges again comprise a vertical portion 63, 66 terminating the window at the top of the image. Whereas the vertical portions define two rectangular areas, the non-vertical portions 62, 65 laterally delimit an area in the shape of a parallelogram called the second area.

Figure 7:
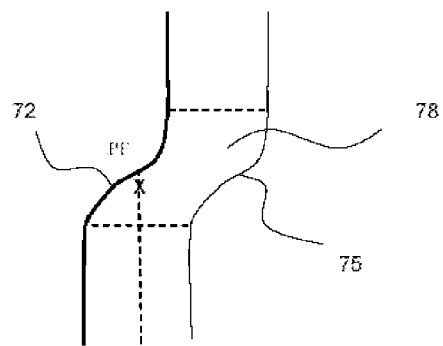

FIG. 7 demonstrates an alternative, wherein the second area 78 produced by the non-vertical portions 72, 75 is curvilinear. The second area 78 is created between a bottom area and an upper area again called the third area.

Figure 8:
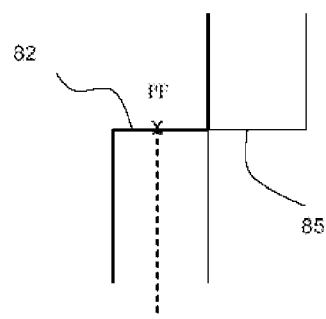

According to the example of FIG. 8 the left edge, between two vertical portions, comprises a non-vertical portion in the shape of a horizontal segment 82 having a width equivalent to the width of the search window. The right edge is formed in a similar way with a horizontal segment 85. In this case, the second area is a simple horizontal right portion and not an area with two dimensions, that is to say, a surface.

Figure 9:
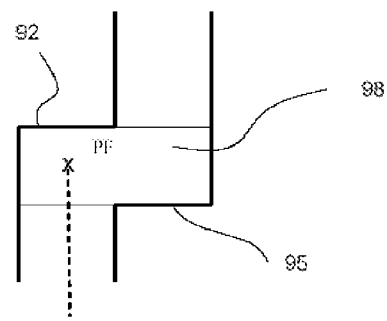

Another case of a horizontal non-vertical portion is illustrated in FIG. 9. There again, two horizontal segments 92, 95, each on an edge, are inserted between vertical portions. The second area is then a rectangle 98 between two bottom and upper areas, likewise rectangular.

Judicious placement of the non-vertical portion(s) in the image enables the areas of the search window to be adapted to the context of the image processing. This is particularly the case in a bend or before a curve in the road.

FIGS. 4 and 5 are two illustrations of this.

These two figures show the same road configuration. Road configuration is understood to mean the context of driving given by the image captured in front of the vehicle equipped with the device. This context includes a carriageway with one or more lanes generally marked on the ground by continuous or discontinuous lines, a sky part and an often very variable environment including vehicles, obstacles, objects bordering the carriageway such as road signs etc. The case in FIGS. 4 and 5 involves traffic on the right of a single carriageway with oncoming traffic, at the start of a bend. Whereas the bend would be poorly taken into account in a window having the shape of a simple band, the window obtained by the invention adapts to the presence of a curve by virtue of the non-vertical portions of the edges.

In FIG. 4, a window geometrically similar to that of FIG. 6 is defined in the following way:

the bottom area 42 is placed so as to cover part of the carriageway; it is centered horizontally on a vertical line 45 passing through the point PF which will be described below;

the third area 41 is placed so as to cover a sky part; and the second area 43 connects the two preceding areas with a lateral offset 47 following the direction of the bend.

In FIG. 5, this offset is also formed with a second area 53 whose geometry is similar to that described with reference to FIG. 9.

Advantageously the position of the areas is given as follows with reference to FIG. 3.

At step 303, the position of a vanishing point PF is calculated corresponding to the termination of the carriageway at the horizon. In the case of FIG. 3, this position is obtained by calculating the intersection of the tangents 46 of two road marking lines on the surface of the carriageway, using a known technique. This solution is not restrictive. An alternative consists in determining a horizon line in the image and from this finding the intersection with a tangent to one road marking line. Another solution is to use the data from a line crossing warning device (known as a "lane departure warning system") capable by its function of determining the position of the road marking lines and able to provide the coordinates of their vanishing point. In addition, the position of the vanishing point can be obtained from video data insofar as the convergence point of the movement vectors of the objects being followed (fixed relatively to the carriageway) corresponds to the vanishing point.

In the examples of FIGS. 4 to 9, the vanishing point PF is employed for centering the bottom area around a vertical line passing through the vanishing point. This enables the bottom area to be well positioned related to the carriageway and good continuity to be ensured with the remainder of the search window particularly during the transition towards the sky. An advantageous result is that the selectivity for positioning the window permits a decrease in its width, such that later calculations with respect to the region of interest are reduced. The width of the search window can be fixed at a value of 160 pixels, being an optimal average width which can be determined based on a sample of images representing several types of road with various kinds of markings. In the same way, an optimal height of the second area can be defined. This is centered on the horizon line and extends to 70 pixels of the two top and bottom sides of the image.

The horizontal calibration of the third area can be defined in the shape of a horizontal offset relatively to the bottom area. Although the offset value can be fixed, it is advantageous to vary it according to the road context and in particular according to the curves of the road. Within this framework, an advantageous solution consists in horizontally offsetting the third area with a value reflecting the extent of the bend being negotiated or in front of the vehicle fitted with the device. This value can be a function (equal or proportional in particular) of at least one of the following data:

the rotation angle of the steering wheel or a proportion of this angle;

the curvature radius of the bend as determined by the images acquired according to the method of the invention or by means of a device for detecting the crossing of lines LDWS;

the curvature radius of the bend as obtained or determined on the basis of cartographic data from a navigation system for example with GPS (global positioning system); and the rotation angle of a front headlamp of the vehicle if this is equipped with a directional lighting device.

This data can be combined to adjust the precision of the horizontal offset of the third area. Alternatively, these data can be used amongst other things within the framework of the invention. For example, data resulting from directional lighting is employed under conditions of low ambient light (at night in particular) and the steering wheel angle provides the relevant data for the rest of the time. It is an effective way to limit the offset at night insofar as the angular amplitude of directional lighting devices is generally less than the steering wheel angle. Another example consists in exploiting the curvature radius data of a bend resulting from the cartography or detection except when the steering wheel angle exceeds a preset value giving it priority for calculating the offset.

By following the diagram of FIG. 3, the third area 308 and the bottom area 310 are thus defined. The second area is likewise defined (step 309). Advantageously, it is centered in height according to the vanishing point PF described above.

In the case of FIG. 8, the second area 82 is then situated on the horizon line carrying the vanishing point PF.

In the cases of FIGS. 6 and 7, the non-vertical portion(s) of the edges have a vertical component, the middle of which is set on the vanishing point PF.

In the case of FIG. 9, the vertical offset of the portions 92 and 95 gives the height of the second area 98. This embodiment is additionally demonstrated in the context of a road image in FIG. 5 where the bottom area is centered relative to the vanishing point and the third area is offset in the direction of the bend, whereas the second area 53 forms a transition through a rectangular surface, centered according to its height, on the vanishing point PF.

The examples illustrated comprise two non-vertical portions, each on a side edge. This case is not restrictive and a single edge can comprise a non-vertical portion. The second area is then laterally delimited by the non-vertical portion and by a facing vertical portion on the opposite edge.

The invention is not limited to the embodiments described but is extended to any embodiment which conforms to the essence of the invention.

While the method herein described, and the forms of apparatus for carrying this method into effect, constitute preferred embodiments of this invention, it is to be understood that the invention is not limited to this precise method and forms of apparatus, and that changes may be made in either without departing from the scope of the invention, which is defined in the appended claims.

What is claimed is:

1. A method for defining a search window to search a region of interest for processing a road image, said search window having a longitudinal orientation directed according to the height of said road image and being laterally delimited by two edges, wherein said method comprises the steps of:
adapting a shape of said search window to the road configuration by defining at least one non-vertical portion on at least one of said two edges; and
positioning said at least one non-vertical portion such that it is situated at least partially in a transitional area of said road image between a road carriageway and the sky.

2. The method according to claim 1, wherein at least two areas are defined in the search window with:
a bottom area laterally delimited by a low vertical portion of each of said two edges;
a second area situated at the top of said bottom area and laterally delimited by said at least one non-vertical portion of each of said two edges.

3. The method according to claim 2, wherein said two edges comprise a low vertical portion below said at least one non-vertical portion.

4. The method according to claim 2, wherein at least one non-vertical portion is defined on the other of said two edges.

5. The method according to claim 1, wherein said two edges comprise a low vertical portion below said at least one non-vertical portion.

6. The method according to claim 5, wherein said at least one non-vertical portion is selected from among: a horizontal right segment, a right-sloping segment, a curvilinear line portion.

7. The method according to claim 1, wherein said at least one non-vertical portion is selected from among: a horizontal right segment, a right-sloping segment, a curvilinear line portion.

8. The method according to claim 1, wherein said at least one non-vertical portion is defined on the other of said two edges.

9. The method according to claim 8, wherein three areas are defined in the search window with:
a bottom area laterally delimited by a low vertical portion of each of said two edges;
a second area situated at the top of said bottom area and laterally delimited by said at least one non-vertical portion of each of said two edges.

10. The method according to claim 9, wherein the position of a vanishing point PF of a road carriageway is defined and said bottom area is laterally positioned according to said position of said vanishing point PF.

11. The method according to claim 10, wherein said bottom area is laterally centered on said vanishing point PF.

12. The method according to claim 10, wherein said position of said vanishing point PF is obtained by means of a device for detecting the crossing of a white line.

13. The method according to claim 12, wherein said bottom area is laterally centered on said vanishing point PF.

14. A method for defining a search window to search a region of interest for processing a road image, said search window having a longitudinal orientation directed according to the height of said road image and being laterally delimited by two edges, wherein said method comprises the steps of:
adapting a shape of said search window to the road configuration by defining at least one non-vertical portion on at least one of said two edges; and
positioning said at least one non-vertical portion such that it is situated at least partially in a transitional area of said road image between a road carriageway and the sky;
wherein at least one non-vertical portion is defined on the other of said two edges; and
wherein said at least one non-vertical portion of said two edges is parallel.

15. The method according to claim 14, wherein three areas are defined in said search window with:
a bottom area laterally delimited by a low vertical portion of each of said two edges;
a second area situated at the top of said bottom area and laterally delimited by said at least one non-vertical portion of each of said two edges.

16. A method for defining a search window to search a region of interest for processing a road image, said search window having a longitudinal orientation directed according to the height of said road image and being laterally delimited by two edges, wherein said method comprises the steps of:
adapting a shape of said search window to the road configuration by defining at least one non-vertical portion on at least one of said two edges; and
positioning said at least one non-vertical portion such that it is situated at least partially in a transitional area of said road image between a road carriageway and the sky;
wherein at least one non-vertical portion is defined on the other of said two edges; and:
wherein three areas are defined in said search window with:
a bottom area laterally delimited by a low vertical portion of each of said two edges;
a second area situated at the too of said bottom area and laterally delimited by said at least one non-vertical portion of each of said two edges;
wherein a third area laterally delimited by a high vertical portion of each one of said two edges is defined, said second area connecting said bottom area and said third area.

17. The method according to claim 16, wherein the position of a vanishing point PF of a road carriageway is defined and said bottom area is laterally positioned according to said position of said vanishing point PF.

18. The method according to claim 16, wherein a third area laterally delimited by a high vertical portion of each of said two edges is defined, said second area connecting said bottom area and said third area and said third area with a lateral offset is positioned relatively to said bottom area, said lateral offset depending on curvature data of a bend of said road carriageway.

19. The method according to claim 16, wherein the position of at least one point of a horizon line of said road image is defined and said second area is vertically centered on a point of the horizon line.

20. A method for defining a search window to search a region of interest for processing a road image, said search window having a longitudinal orientation directed according to the height of said road image and being laterally delimited by two edges, wherein said method comprises the steps of:
adapting a shape of the search window to the road configuration by defining at least one non-vertical portion on at least one of said two edges; and
positioning said at least one non-vertical portion such that it is situated at least partially in a transitional area of said road image between a road carriageway and the sky;
wherein at least one non-vertical portion is defined on the other of said two edges; and:
wherein three areas are defined in the search window with:
a bottom area laterally delimited by a low vertical portion of each of said two edges;

a second area situated at the too of said bottom area and laterally delimited by said at least one non-vertical portion of each of said two edges;

wherein the position of a vanishing point PF of a road carriageway is defined and said bottom area is laterally positioned according to said position of said vanishing point PF;

wherein the non-vertical edges of said second area are moved and/or deformed according to the direction of the bend, said vanishing PF being inside said second area.

21. A method for defining a search window to search a region of interest for processing a road image, said search window having a longitudinal orientation directed according to the height of said road image and being laterally delimited by two edges, wherein said method comprises the steps of:

adapting a shape of said search window to the road configuration by defining at least one non-vertical portion on at least one of said two edges; and positioning said at least one non-vertical portion such that it is situated at least partially in a transitional area of said road image between a road carriageway and the sky;

wherein at least one non-vertical portion is defined on the other of said two edges; and:

wherein three areas are defined in said search window with:

a bottom area laterally delimited by a low vertical portion of each of said two edges;

a second area situated at the too of said bottom area and laterally delimited by said at least one non-vertical portion of each of said two edges;

wherein a third area laterally delimited by a high vertical portion of each of said two edges is defined, said second area connecting said bottom area and said third area and said third area with a lateral offset is positioned relatively to said bottom area, said lateral offset depending on curvature data of a bend of said road carriageway.

22. A method for defining a search window to search a region of interest for processing a road image, said search window having a longitudinal orientation directed according to the height of said road image and being laterally delimited by two edges, wherein said method comprises the steps of:

adapting a shape of said search window to the road configuration by defining at least one non-vertical portion on at least one of said two edges; and positioning said at least one non-vertical portion such that it is situated at least partially in a transitional area of said road image between a road carriageway and the sky;

wherein at least one non-vertical portion is defined on the other of said two edges; and:

wherein three areas are defined in said search window with:

a bottom area laterally delimited by a low vertical portion of each of said two edges;

a second area situated at the too of said bottom area and laterally delimited by said at least one non-vertical portion of each of said two edges;

wherein the position of at least one point of a horizon line of said road image is defined and said second area is vertically centered on a point of the horizon line.

23. A method for determining a visibility distance in foggy weather, wherein a region of interest is determined within a search window defined by implementing the method according to any one of the preceding claims, wherein the method comprises the following steps:

adapting a shape of said search window to the road configuration by defining at least one non-vertical portion on at least one edge of an image; and positioning said at least one non-vertical portion such that it is situated at least partially in a transitional area of said image between a road carriageway and the sky:

wherein an average luminance level is determined for a plurality of lines in this region of interest, a luminance profile is deduced therefrom, an inflection point is identified on this luminance profile and a visibility distance is deduced from said inflection point.

24. A system for determining a window to search a region of interest in an image, wherein it comprises a device for acquiring an image and a processor adapted for processing arranged to implement the steps of:

adapting a shape of said search window to the road configuration by defining at least one non-vertical portion on at least one of the edges; and positioning said at least one non-vertical portion such that it is situated at least partially in a transitional area of said image between a road carriageway and the sky.

25. The system according to claim 24, comprising a device for detecting the crossing of white lines, configured to produce data for defining a position of a vanishing point and for transmitting said data to said processor.

26. A method for defining a search window to search a region of interest for processing a road image, said search window having a longitudinal orientation directed according to the height of said road image and being laterally delimited by two edges, wherein said method comprises the steps of:

adapting a shape of said search window to the road configuration by defining at least one non-vertical portion on at least one of said two edges; and positioning said at least one non-vertical portion such that it is situated at least partially in a transitional area of said road image between a road carriageway and the sky;

wherein at least one non-vertical portion is defined on the other of said two edges; and:

wherein three areas are defined in said search window with:

a bottom area laterally delimited by a low vertical portion of each of said two edges;

a second area situated at the too of said bottom area and laterally delimited by said at least one non-vertical portion of each of said two edges;

wherein the position of a vanishing point PF of a road carriageway is defined and said bottom area is laterally positioned according to said position of said vanishing point PF;

wherein said position of said vanishing point PF is obtained by means of a device for detecting the crossing of a white line;

wherein the non-vertical edges of said second area are moved and/or deformed according to the direction of the bend, said vanishing PF being inside said second area.

27. A method for defining a search window to search a region of interest for processing a road image, said search window having a longitudinal orientation directed according to the height of said road image and being laterally delimited by two edges, wherein said method comprises the steps of:

adapting a shape of said search window to the road configuration by defining at least one non-vertical portion on at least one of said two edges; and positioning said at least one non-vertical portion such that it is situated at least partially in a transitional area of said road image between a road carriageway and the sky;

wherein at least one non-vertical portion is defined on the other of said two edges; and:

wherein three areas are defined in said search window with:

a bottom area laterally delimited by a low vertical portion of each of said two edges;

a second area situated at the too of said bottom area and laterally delimited by said at least one non-vertical portion of each of said two edges;

wherein the position of a vanishing point PF of a road carriageway is defined and said bottom area is laterally positioned according to said position of said vanishing point PF;

wherein said bottom area is laterally centered on said vanishing point PF;

wherein the non-vertical edges of said second area are moved and/or deformed according to the direction of the bend, said vanishing PF being inside said second area.

28. A system for improving a driver's ability to navigate a road vehicle, said system comprising:

an image system for capturing a road image;

a processor configured to execute a sequence of instructions for defining a search window to search a region of interest for processing a road image, said search window having a longitudinal orientation directed according to the height of said road image and being laterally delimited by two edges;

said processor adapting a shape of said search window to the road configuration by defining at least one non-vertical portion on at least one of said two edges and in that said at least one non-vertical portion is positioned such that it is situated at least partially in a transitional area of said road image between a road carriageway and the sky.

29. The system according to claim 28, wherein at least two areas are defined in said search window with:

a bottom area laterally delimited by a low vertical portion of each of said two edges;

a second area situated at the top of said bottom area and laterally delimited by said at least one non-vertical portion of each of said two edges.

30. The system according to claim 28, wherein said two edges comprise a low vertical portion below said at least one non-vertical portion.

31. The system according to claim 28, wherein said at least one non-vertical portion is selected from among: a horizontal right segment, a right-sloping segment, a curvilinear line portion.

32. The system according to claim 28, wherein said at least one non-vertical portion is defined on the other of said two edges.

33. A system for improving a driver's ability to navigate a road vehicle, said system comprising:

an image system for capturing a road image;

a processor executing one or more sequence of instructions adapted to define a search window to search a region of interest for processing said road image, said search window having a longitudinal orientation directed according to the height of said road image and being laterally delimited by two edges;

said processor adapting a shape of said search window to the road configuration by defining at least one non-vertical portion on at least one of said two edges and in that said at least one non-vertical portion is positioned such that it is situated at least partially in a transitional area of said road image between a road carriageway and the sky.

34. The system according to claim 33, wherein at least two areas are defined in said search window with:

a bottom area laterally delimited by a low vertical portion of each of said two edges;

a second area situated at the top of said bottom area and laterally delimited by said at least one non-vertical portion of each of said two edges.

35. The system according to claim 33, wherein said two edges comprise a low vertical portion below said at least one non-vertical portion.

36. The system according to claim 33, wherein said at least one non-vertical portion is selected from among: a horizontal right segment, a right-sloping segment, a curvilinear line portion.

37. The system according to claim 33, wherein said at least one non-vertical portion is defined on the other of said two edges.

* * * * *